UNITED STATES PATENT OFFICE.

ANTOINE RADISSON ST. CYR, OF LYONS, FRANCE.

IMPROVEMENT IN TREATING FATTY MATTERS FOR THE MANUFACTURE OF CANDLES.

Specification forming part of Letters Patent No. 101,835, dated April 19, 1870.

*To all whom it may concern:*

Be it known that I, ANTOINE RADISSON ST. CYR, of Lyons, in the Empire of France, have invented Improvements in the Treatment of Oleine and other Fatty Matters, for the purpose of transforming them into solid materials suitable for the manufacture of candles; and I do hereby declare that the following is a full and exact description thereof.

Hitherto, when treating tallow or other fatty matters for the manufacture of what are commonly called "stearine candles," the quantity of stearine or solid material obtained was limited by the amount of it naturally contained in the said fatty matters, and consequently the manufacture was limited to the mere separation of the solid from the liquid (oily) materials. By the acidifying and distilling processes the largest percentage of stearine obtained from tallow has been fifty-eight per cent., and by the lime saponification only forty-seven per cent. By the process which forms the subject of my invention the full amount of oleine contained in tallow is solidified, and the percentage of stearine obtained from the latter varies from eighty-eight to ninety per cent. of its weight.

Before entering into a full description of my mode of operating, I wish to give a concise account of some of the various attempts which have been made for obtaining the same important result just mentioned, in order to allow of duly ascertaining in what consists the novelty of my invention, and the reason why those who tried before me have not been successful in their attempts. About thirty years since Professor Varrentrapp, a German chemist, observed, when treating at a high temperature, pure oleic acid with an excess of caustic potash, that the oleic acid became transformed into acetic acid, and a fatty acid of a higher melting point than elaidic acid, and which recent researches have proved to be identical with palmitic acid extracted from palm-oil. This scientific observation was published in various works on chemistry, but no attempt was made to apply it practically until 1857, when, on the 16th day of July, a provisional protection was granted in England to A. Gilbee, as a communication made to him by Messrs. Dangeville, Redthammer, and Kalisher, for a process of solidifying oily and fatty bodies by the action on them of caustic alkalies at a high temperature. The process consisted, essentially, in preparing, by the cold method, a soap with a great excess of alkali—viz., either potash or soda—and then submitting this soap in thin layers in a closed vessel to the action of superheated steam. One of the inventors of the said process, to whom I applied for some particulars respecting the experiments made at that time, informed me that caustic soda was the alkali made use of by them, potash being considered impracticable, in consequence of its high price, and that, notwithstanding a great many attempts were made, they did not succeed in obtaining the solidification indicated by theory. The reasons of this failure, and which may easily be understood by my researches, are, first, that caustic soda alone is insufficient for procuring the solidification of the oleine, and, secondly, the deficiency of the temperature, which, for fear of destroying the fatty matters, was never raised above 250° centigrade. On the 19th of August, 1863, the same Mr. Dangeville, having made other experiments, applied for a patent in France in the name of Messrs. Dangeville and Baliat. Various experiments were made on a large scale, and some complete solidifications were obtained, which results had not been realized in the attempts above referred to made in England, but, notwithstanding the considerable amount of money expended by Messrs. Dangeville and Baliat in improving their process, this latter was finally given up. Messrs. Dangeville and Baliat operated by means of a caustic lye of potash and soda, in cast-iron pans of a particular shape, in which the lye was heated till the water of it was nearly evaporated, and until reaching about the melting-point of the alkalies. They then incorporated with these latter a suitable quantity of the tallow or grease to be solidified, the soap which was thus formed, and which would have collected on the top of the excess of the melted alkalies, being kept immersed by means of a perforated wrought-iron disk of sufficient weight. A suitable degree of heat being applied, the solidifying was obtained, after which the excess of alkali was separated from the soap, and the latter decomposed by sulphuric acid. The solid fatty acids resulting from this process were afterward purified by distilling them in the ordinary manner, and were then fit for being molded into candles. The reasons why this process did not succeed practically were, first, the large amount of alkali required; secondly, the loss of fatty bodies resulting from the distilling and the elevated temperature in presence of so large a quantity of caustic alkali; and, thirdly, the difficulty of keeping the alkaline bath sufficiently pure, for, after a few operations, this latter became unfit for procuring the solidification of the soap, notwithstanding some fresh lye was added at each operation.

The process which forms my invention is based on the following facts: First, in presence of a small excess of caustic potash the oleate of potash becomes entirely transformed into palmitate and acetate of potash, the large amount of caustic potash as mentioned by Varrentrapp, and made use of in Dangeville's process, being unnecessary; secondly, by gradually raising the temperature of and suitably stirring the mass the solidification of the tallow or other fatty matters made use of is effected without impairing or darkening their color, and by suitably purifying by hot pressing the stearine is at once obtained in a suitable white state to dispense with any further distilling, and allow of its being at once made use of for molding into candles; thirdly, if the proper degree of heat be kept up and the mass well stirred, the loss of fatty matters is but trifling, and corresponds nearly enough with that resulting from the chemical reaction, as indicated by theory; fourthly, it is of the utmost importance that during the solidifying and the cooling of the alkaline soap any admittance of atmospheric air should be carefully and as completely as practically possible prevented, the said air acting instantaneously on the soap when this latter is at this high degree of heat, and giving rise to colored ulmine compounds resulting from the partial decomposition of the fatty acids; fifthly, caustic soda alone is not sufficient for effecting the solidifying of the oily fatty acids. A compound of one part soda and two parts of potash gives the best results.

I now will describe my mode of operating— viz., as made use of at my stearine candle factory at Saint Fons, near Lyons, France.

In a flat-bottomed wrought-iron vessel I mix together and evaporate six hundred pounds of tallow or red oil (oleine) and one thousand pounds of a caustic lye (formed of one part of soda and two parts of potash dissolved in water, and marking about 42° of Baumé's aerometer) until the soap or mass thus obtained becomes clammy—viz., of a semi-fluid consistence. This soap, which contains an excess of alkali, is then put into sheet-iron cylinders closed at one end, and provided at the opposite end with a cast iron head consisting of an annular part riveted to the cylinder, and a movable one serving as a stopper or plug for the purpose of allowing the filling of the cylinder and afterward withdrawing the contents. This plug or stopper fits into and may be fixed to the annular parts by screws or other suitable means, so as to allow of hermetically closing the cylinder. In the center of the plug is provided a small round hole or aperture of about one and one-half inch in diameter—viz., just sufficient for introducing through it an agitator or rake for stirring the charge or materials in the interior of the cylinder, while preventing the outer air from entering into this latter by the said aperature— and in the upper part of the annular head is provided a vent-hole of about half an inch in diameter, for the purpose of allowing the vapors or gases evolved in the interior of the cylinder to escape into the air. Several of these cylinders are filled with the alkaline soap, and each of them is introduced into a cast-iron jacket, a sufficient number of which are situated in a suitable furnace, so as to allow of acting on a suitable number of cylinders at a time and preventing the flames from touching these latter whereas by means of these jackets or outer cylinders the heat is distributed in a uniform manner on the materials contained in the wrought-iron or inner cylinders. The alkaline soap or mass is then gradually heated to about the melting-point of lead— viz., about 630° Fahrenheit, and kept continually stirred by means of the agitator, which latter may be worked by manual or by mechanical power. The first effect of the heat is that of evaporating the water contained in the soap, and thus hardening this latter, after which the chemical reaction begins and gases, principally hydrogen, are evolved through the vent-hole, and which gases on being lighted burn with a colorless flame. After a certain time the soap becomes liquid, and the hydrogen mixing with some carbureted gases, the flame turns reddish and finally becomes white, which indicates the end of the operation. The cylinders are then withdrawn from their respective jackets, and may at once be replaced by others. The vapors or gases which, during the operation, escape by the vent-holes effectually prevent the atmospheric air from entering into the cylinders, and thus acting on the soap in the interior of these latter, and after the cylinders have been withdrawn from the jackets the evolving of the gases continues sufficiently long for preserving the soap from the injurious effect of the air and prevent the access of this latter into the cylinder until, the soap having become sufficiently cool, the destructive and coloring effects of the air are no further to be feared. The soap, after having become cold, is withdrawn from the cylinders, and now forms a light porous mass, which is then heated with weak lye for the purpose of separating therefrom the excess of alkali, after which the soap or mass, retaining only such quantity of alkali as results from its chemical constitution, is decomposed by means of diluted sulphuric acid, so as to set free the fatty acids. The fatty acids obtained by the above-described process are finally hot-pressed, in order to get them perfectly white, and the liquid matters which thereby run off are treated in the ordinary manner by hot and cold pressing, after having previously mixed therewith a small portion of soft fatty acid. The sulphates of potash and soda resulting from the decomposition of the soap by sulphuric acid are to be converted into carbonates by the ordinary soda-manufacturer's process—viz., by means of coal and chalk, and the solution of carbonates of carbonates of soda and potash, having been made caustic, may then serve again for another operation, and consequently the only loss in alkali which takes place by this process is that resulting from the conversion of the sulphates into carbonates.

My process, which allows of obtaining from tallow, oleine, or other suitable fatty matters a much larger amount of solid material (stearine) than by the hitherto known processes, the oleine or liquid oily material becoming by my process transformed into solid material, (stearine,) suitable for the manufacture of candles, consists consequently essentially in: first, transforming tallow, oleine, or other suitable fatty matters into a semi-fluid soap, presenting an excess of alkali by acting on the said matters with a comparatively small excess of alkali by means of a caustic lye of soda and potash, by preference one part of soda to two parts of potash; secondly, transforming the said semi-fluid soap into a light porous mass by gradually heating the same to about 630° Fahrenheit in any suitable vessel which allows of keeping the outer or atmospheric air as completely as practically possible excluded from the soap during the heating and cooling of this latter, the vessel allowing of duly stirring the soap while being heated; thirdly, separating from the light porous mass thus obtained any excess of alkali by means of weak alkaline lyes, and afterward treating the mass with a suitable diluted acid, by preference sulphuric acid, for procuring the separation of the solid fatty acids; and, finally, fourthly, submitting these latter to hot and cold pressing, by which means a solid material (stearine) suitable for the manufacture of candles is obtained.

What I claim as my invention in the treatment of tallow, oleine, or other suitable fatty matters for the purpose of transforming them into solid materials suitable for the manufacture of candles is—

1. Making use of a comparatively small excess of alkali for transforming the fatty matters to be operated on into a semi-fluid soap containing an excess of alkali.

2. The gradual regular heating to about 630° Fahrenheat and suitable stirring of the said soap in vessels which allow of effectually excluding the atmospheric air from them during the heating, stirring, and cooling of the soap, and the transformation of the latter into a light porous mass from which the solid fatty acids may be separated in the manner described.

3. The perfect exclusion of the air from the interior of the vessels containing the above-mentioned semi-fluid soap during the heating, stirring, and cooling of the latter.

A. RADISSON ST. CYR.

Witnesses:
 BAUVIER,
 BRUSSIENT.